United States Patent [19]
Voyles et al.

[11] 3,806,770
[45] Apr. 23, 1974

[54] ELECTRICAL CAPACITOR WITH NON-INDUCTIVE LEADS

[75] Inventors: Gerald A. Voyles; Paul S. Deak, both of Indianapolis, Ind.

[73] Assignee: P. R. Mallory & Co. Inc., Indianapolis, Ind.

[22] Filed: Feb. 21, 1973

[21] Appl. No.: 334,418

[52] U.S. Cl............... 317/230, 29/25, 29/32, 174/52 PE, 174/138 G, 264/272, 317/260
[51] Int. Cl............... H01g 9/00, H01g 1/14
[58] Field of Search............... 317/260, 261, 230; 174/52 PE, 138 G; 264/272; 29/25, 32

[56] References Cited
UNITED STATES PATENTS

| | | | |
|---|---|---|---|
| 1,619,201 | 3/1927 | Fried................ | 317/260 |
| 2,249,493 | 7/1941 | Pistor................ | 317/260 |
| 3,197,164 | 7/1965 | Hansen................ | 174/138 G |
| 3,231,798 | 6/1966 | McCutchen................ | 317/230 X |

Primary Examiner—E. A. Goldberg
Attorney, Agent, or Firm—Richard H. Childress; Charles W. Hoffmann; Robert F. Meyer

[57] ABSTRACT

An electrical component means and method of making same. The component means includes an electrical component body such as a capacitor body and continuous terminal means, preferably U-shaped, with portions immediately adjacent one side of the component body joined to that side of the component body. Lead means of the continuous terminal means, preferably a pair of spaced and parallel elongated wires of the U-shaped terminal means, project from the component body in the same direction. Each of the lead means is adapted to project through and is adapted to be secured against movement relative to apertures of an electrically insulating base means. The configuration of the terminal means and intimate engagement thereof along the entire length of each immediately adjacent side of the component body cooperate to help reduce the impedance of the electrical component means at elevated frequencies. If high frequency operation is not a consideration, the lead wires of the terminal means may be inserted through apertures of a support means and twisted together on a side of the support means opposite the side of the support means adjacent the base means of the component body to help cooperatively associate the component body with the support means.

23 Claims, 8 Drawing Figures

PATENTED APR 23 1974 3,806,770

ELECTRICAL CAPACITOR WITH NON-INDUCTIVE LEADS

The present invention relates to a terminal configuration for electrical component means, and more particularly, to an electrical component means having a pair of substantially identical electrical terminal means each being continuous and having a plurality of lead means. The pair of continuous terminal means function to help reduce the high frequency impedance of the electrical component means over a similar electrical component means with an axial or radial terminal configuration, and aids in the fabrication of the electrical component means.

"Electrical component means" as used herein means and includes all types of capacitors, resistors and inductors operable at high frequency. However, for the purpose of the clarity and not for the purpose of limitation, the concepts of the invention will be discussed in relation to a solid tantalum capacitor operable at high frequencies, that is, at frequencies up to and including 100 MHz.

The terminal configuration of the present invention helps to reduce the impedance at high operating frequencies of a solid tantalum capacitor and aids in the fabrication of the capacitor.

A conventional means of terminating a solid tantalum capacitor is to weld an elongated substantially straight axial or radial lead wire to the anode side of the capacitor body, and to solder an elongated substantially straight axial or radial wire to the cathode side of a capacitor body. One of the elongated lead wires projects from the anode side of the capacitor body and the other of the elongated lead wires projects from the cathode side of the capacitor body. This form of termination for a capacitor body tends to have an undesirable impedance value at high operating frequencies, that is, an undesirable impedance value at frequencies in excess of 1 MHz.

It has been found that the impedance value of a capacitor is significantly reduced at elevated operating frequencies over an axial or radial lead wire type terminal configuration for a capacitor by using a continuous first terminal means, preferably having a substantially U-shape, with a plurality of lead wire means having all portions immediately adjacent the anode side of the capacitor body joined to the anode side of the capacitor body, and a continuous second terminal means, preferably having a substantailly U-shape, with a plurality of lead wire means having all portions immediately adjacent the cathode side of the capacitor body joined to the cathode side of the capacitor body. If the impedance of the electrical component means is not a prime consideration, then the plurality of lead wires of the first terminal means may be twisted together, and the plurality of lead wires of the second terminal means may be twisted together adjacent a side of an electrically insulating support means to help cooperatively associate the electrical component means with the support means.

A feature of the invention is to provide an electrical component means including continuous first and second terminal means each having a pair of elongated wire leads, the entire length of the first terminal means immediately adjacent the input side of the electrical component means intimately joined to the input side of the electrical component means, and the entire length of the second terminal means immediately adjacent the output side of the electrical component means is intimately joined to the output side of the electrical component means. Another feature of the invention is to provide an electrical component means and an apertured electrically insulating base means cooperatively associated with the electrical component means in such a manner as to retain positively and accurately locate the electrical component means during encapsulation thereof. Yet another feature of the invention is to provide an electrical component means with terminal means capable of being adjusted easily and conveniently to dimensional variations of the electrical component means. A feature of the invention is an electrical component means that is easy and simple to encapsulate and that readily leads itself to various types and configurations of encapsulation. A further feature of the present invention is engaging elongated lead wires of U-shaped terminal means to a side of apertured support means opposite the side adjacent the electrical component means such as to cooperatively associate, preferably lock, the electrical component means to the support means. Another feature of the invention is to provide an electrical component body with a pair of resilient terminal wires for the anode side and a pair of resilient terminal wires for the cathode side of the electrical component body which project thru apertures in a support means and are twisted together on a side of the support means opposite the side adjacent the electrical component body.

Other features of the invention will become apparent from the drawings, the following description and appended claims.

Figure 1:
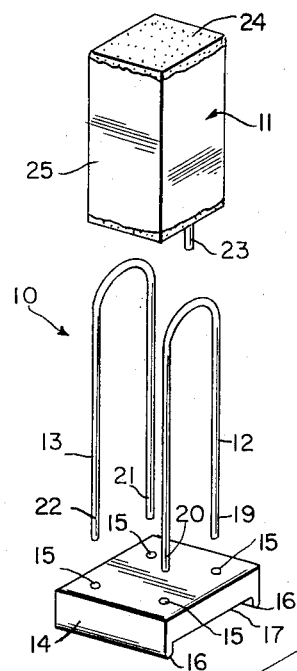
FIG. 1 is an exploded, isometric view of an electrical component means including an electrical component body, a pair of continuous substantially U-shaped terminal means and apertured electrically insulating base means.
Figure 2:
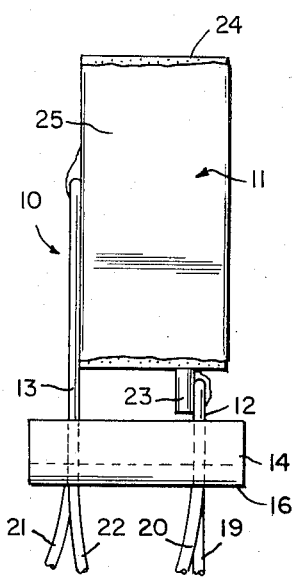
FIG. 2 is a side elevational view of the electrical component means of the FIG. 1 with the various parts in cooperative association.

Referring now to FIGS. 1 and 2 of the drawing, an electrical component means 10 includes an electrical component body 11, a pair of continuous terminal means 12 and 13, preferably U-shaped, and an electrically insulating base means 14. The base means 14 is formed from a suitable electrically insulating, substantially rigid material such as BAKELITE plastic, plastic, nylon or the like. The presently preferred material for the base means 14 is nylon. Preferably, the material of the base means 14 is compatible with the material to be employed in encapsulating the electrical component body 11.

The base means 14 includes a plurality of predeterminately located apertures 15, and a pair of elongated stand-off means 16 extending from surface 17 of the base means. The number of apertures 15 provided in the base means 14 is four, one for each lead wire of the terminal means 12 and 13. The function of the elongated stand-off means 16 is to provide the base means 14 with a firm foundation when engaged with a suitable support means such as support means 30 shown in FIGS. 7 and 8 of the drawing. Variations in the configuration of the stand-off means 16 can be used to provide a suitable means for identifying the electrical polarity of the terminal means of the electrical component means. Alternatively, polarity identification of the terminal means of the electrical component means may be provided by suitable characters or in the form of projections such boss 18 formed the base means 14 as shown in FIG. 8.

The continuous substantially U-shaped terminal means 12 and 13 include elongated lead wire means 19 and 20, and 21 and 22, respectively. The continuous terminal means 12 and 13 provide a path for current flow into and out of the electrical component body 11 through the base member 14. The terminal means 12 and 13, and hence the lead wire means 19 and 20, and 21 and 22 are made of a highly conductive and resiliently metal such as nickel, copper, copper base alloy and the like. It is presently preferred that the terminal means be made of nickel wire. As shown in FIGS. 2–5 of the drawing, the U portion and all other portions of the U-shaped terminal means 12 immediately adjacent anode riser 23 are intimately joined to the riser 23 projecting from the electrical component body 11 by any suitable means such as by welding. The free ends of elongated lead wires 19 and 20 of the terminal means 12 are inserted into and project thru apertures 15 in the base means 14 in the manner illustrated in FIGS. 2–5. In a similar fashion, the free ends of elongated wires 21 and 22 of the terminal means 13 are inserted into and project thru cooperatively associated apertures 15 in the base means 14. As shown in FIGS. 2–5, the U-portion of the substantially U-shaped terminal means 13 and all other portions of the terminal means 13 immediately adjacent to side 25 of the electrical component means are intimately joined to that side of the electrical component body means 11 in any suitable manner such as by soldering.

As illustrated in the several FIGURES of the drawing, the electrical component body 11 includes an anode body 24 and the anode riser 23. The anode body 24 and the anode riser 23 provide one side (the anode side) of the electrical component means 10. The anode body 24 and the anode riser 23 are made of the same film-forming metal. Suitable film-forming metals are tantalum aluminum, niobium and the like. The anode body 24 includes a myriad of intercommunicating voids (not shown). The surfaces of the anode body 24 are coated with a suitable dielectric (not shown) such as an oxide of the metal of the anode body. A suitable solid electrolyte (not shown), such as manganese dioxide, is over the oxide of the metal of the anode body 24. The cathode side 25 of the electrical component 10 is a suitable electrically conductive material such as metallic paint, solder and the like.

In the manufacture of electrical component means 10, the elongated lead wires 19, 20, 21, and 22 are each inserted into the apertures 15 of the electrically insulating base means 14 so as to project the required distance from the surface 17 of the base means in spaced substantially parallel relationship. It is important to minimize the length of each of the elongated lead wires from the point of the last intimate contact or engagement with the component body means 11 to the point where each elongated lead wire projects beyond the stand-off means 16 if minimum impedance values at elevated operating frequencies are to be realized.

The elongated lead wires 19 and 20, and 21 and 22 of the terminal means 12 and 13, respectively, are inserted into apertures 15 of the base member by aligning the lead wires with the apertures and bringing the electrical component body 11 into abutting relationship with the base member so that the elongated lead wires project thru the apertures 15. Each of the lead wires 19, 20, 21 and 22 of the terminal means 12 and 13 are suitably joined to the base means 14 by encapsulating the electrical component body 11 in a manner described hereinafter. The cross sectional dimensions of the elongated lead wires 19, 20, 21 and 22 in relation with the cross sectional dimensions of apertures 15 of the base means 14 are such that manual or machine insertion of lead wires 19 and 20, and lead wires 21 and 22 into the apertures 15 of the base means 14 can be readily accomplished.

Figure 3:
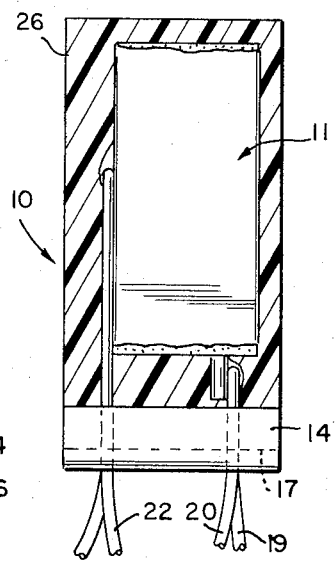
FIG. 3 is a vertical sectional view of an encapsulated electrical component means.

Having provided the electrical component body 11 in cooperative association with the base means 14 by inserting the lead wires 19 and 20, and 21 and 22 into the apertures 15 of the base means, the combination of the electrical component body and the base means, as illustrated in FIG. 2, is ready for encapsulation. FIG. 3 shows one form of encapsulation use to house the electrical component means 10. Encapsulant 26, a suitable insulating resinous material such as a thermoplastic or thermosetting resin material, is formed over the component body means 11 so as to substantially completely encapsulate the component means 11 and join the base means 14 to the insulating resinous encapsulant material 26. One method of encapsulating component body means 12 is to place the component body means and base means 14 in a mold cavity (not shown). The component body means 11 is supported in the mold cavity by the base means 14 and its stand-off means 16. A suitable thermoplastic or thermosetting resin material compatible with the material of the base means 14 and the body means 11 is injected into the mold and formed over the electrical component body 11. Preferably, the material injected into the mold cavity and the material of the base means 14 are the same. Suitable thermoplastic materials for injection molding that are compatible with the materials of a solid type capacitor body include polypropylene, polystyrene, polycarbonate and polyurethane resins. It is possible to use epoxy, diallyl phthalates, phenolic or other thermosetting resins capable of molding and which do not harmfully effect the electrical component body 11.

Figure 4:
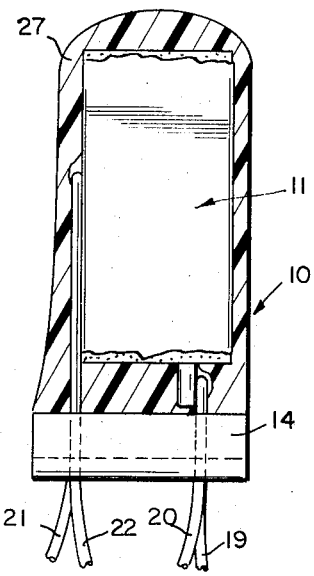
FIG. 4 is an electrical component means in a modified form of encapsulation.

Another form for encapsulating the electrical component body means 11 and joining the base means 14 thereto is shown in FIG. 4. Encapsulation is achieved by immersing the electrical component body means 11 in a molten bath (not shown) of electrically insulating resinous material such as a thermoplastic or thermosetting resin of the type recited above so as to provide an encapsulant 27 of such resin.

Figure 5:
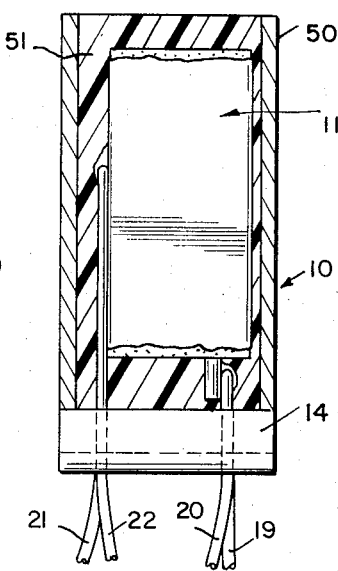
FIG. 5 is an electrical component means in yet another modified form of encapsulation.
Figure 6:
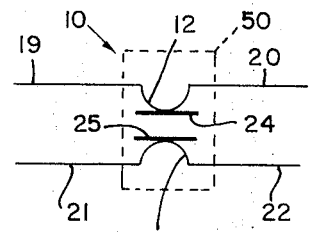
FIG. 6 is an electrical schematic of the electrical component means of FIGS. 1–5.

An electrical component body 11 having added protection against abusive handling is shown in FIG. 5. The electrical component body 11 is inserted into sleeve means 50 of MYLAR. The inside dimensions of the sleeve means 50 are slightly greater than that of outside dimensions of the electrical component body means 11. The void space between the inner wall of the sleeve means 50 and the electrical component means 11 is filled with a suitable potting or filler material 51. The potting or filler material 41 may include lengths of a suitable dielectric fiber reinforcement (not shown). A suitable dielectric fiber reinforcement includes mineral fibers such as glass, asbestos, calcium carbonate, and organic fibers such as macerated nylon.

The embodiments shown in FIGS. 3, 4, and 5, ideally include at least the outer periphery of the surface of the base means 14 covered by encapsulant. The free ends of the elongated lead wires 19, 20, 21 and 22 project from the apertures 15 of the base means 14. Ideally, encapsulant has flows into the apertures 15 so as to fill each.

Figure 7:
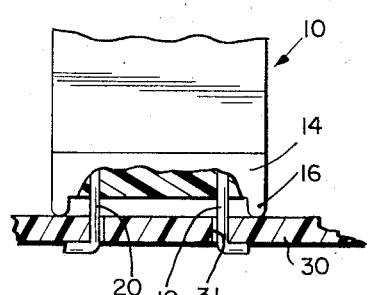
FIG. 7 is a side elevational view with portions cut away of the encapsulated electrical component means of FIG. 5 with lead wire means clenched in cooperative association with a support means.
Figure 8:
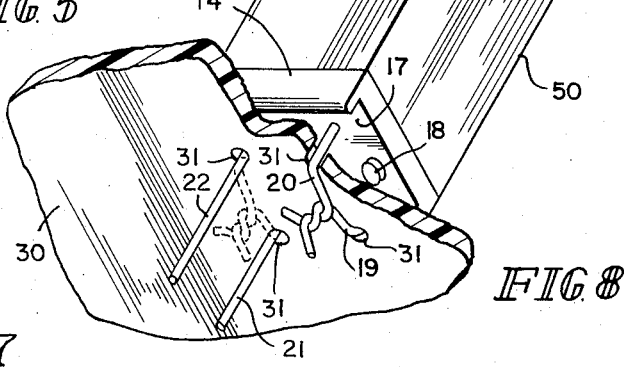
FIG. 8 is a perspective view having portions cut away of the encapsulated electrical component means of FIG. 5 with lead wire means twisted together in cooperative association with a support means.

FIG. 7 shows the electrical component means 10 of FIG. 5 mounted on support means 30 for operation at high frequencies. The support means 30 is made of any suitable electrically insulating material and is, preferably, a printed circuit board which has one side including electrically conductive paths (not shown) embedded in the electrically insulating support means 30. The conductive paths (not shown) serve to connect the electrical component means 10 into an electrical circuit. The conductive paths (not shown) are electrically insulated from each other by the electrically insulating material of the support means 30 therebetween. The lead wires 19 and 20, and and 21 and 22 are aligned with apertures 31 in the support means 30 and inserted into apertures 31 so as to project therethrough. Each of the lead wires 19 and 20, and 21 and 22 are bent over at about a right angle and clenched with the support means 30 in the manner shown in FIG. 7 so as to help cooperatively associate the electrical component means 10 with the support means 30. Excess lengths of the lead wires 19 and 20, and 21 and 22 are removed from the clenched lengths. Under no circumstance do lead wires 10 or 20 electrically contact lead wires 21 or 22. The clenched lengths of the lead wires may be fixedly attached to the conductive paths by solder.

Comparative data are given in Tables I and II to show the difference, and a significant difference in impedance is noted at operating frequencies of 1 MHz and higher.

Impedance data at various input frequencies for a four termiinal capacitor as shown in FIG. 5 of the drawing is given in Table I. Impedance data for two terminal capacitor at various input signal frequencies is given in Table II. The two terminal capacitor is the four terminal capacitor of FIG. 5 with the lead wire 19 of the anode side and with the lead wire 21 of the cathode side connected in the test circuit. Lead wires 20 and 22 are open circuited. In each device the anode of the capacitor is a tantalum anode having a myriad of intercommunicating voids. The tantalum anode surface is substantially covered with a dielectric film of an oxide of tantalum. The electrolyte is solid manganese dioxide. The electrolyte is covered with solder and the body is encapsulated in epoxy. The rating of each capacitor is about $\mu 50$ F at about 10Vdc. The test circuit used included a vector voltmeter.

TABLE I

| | Frequency | | | | | |
|---|---|---|---|---|---|---|
| | 1 KHz | 10 KHz | 100 KHz | 1 MHz | 10 MHz | 100 MHz |
| Impedance (ohms)........... | 3 | 0.3 | 0.08 | 0.03 | 0.08 | 0.9 |

TABLE II

| | Frequency | | | | | |
|---|---|---|---|---|---|---|
| | 1 KHz | 10 KHz | 100 KHz | 1 MHz | 10 MHz | 100 MHz |
| Impedance (ohms)........... | 3 | 0.3 | 0.14 | 0.08 | 0.3 | 4 |

At the lower input frequencies, the impedance value of the two terminal capacitor and the impedance value of the four terminal capacitor are substantially the same. A difference in impedance values is evident at frequencies of 100 KHz, and a significant difference in impedance is noted at 1 MHz and higher.

Should a low-impedance electrical component means at high frequency to be of primary concern, the lead wires 19 and 20, and lead wires 21 and 22 may be engaged in the manner indicated in FIG. 8 to lock the electrical component means 10 to electrically insulating support means 30. The leads 19 and 20, and 21 and 22 are aligned with apertures 31 in the electrically insulating support means 30 and inserted into the apertures 31 so as to project therethrough. The lead wires 19 and 20 are twisted together as shown in FIG. 8 to help cooperatively associate the electrical component means 10 with the insulating support means 30. The lead wires 21 and 22 are twisted together as shown in FIG. 8 to help cooperatively associate the electrical component body 11 with the insulating support means 30. It should be recognized that twisting leads 19 and 20 together and twisting leads 21 and 22 together takes away at least some if not all of the advantage of reduced impedance at high frequency associated with the four terminal device of FIGS. 2–6. Alternatively, one pair of lead wires (either lead wires 19 and 20 or lead wires 21 and 22) may be twisted with the lead wires of the other terminal connection not twisted together and, therefore, connected in an electrical circuit independently. A pellet resistor having an A terminal and a P terminal is shown in U. S. Pat. No. 3,193,611.

It should be understood that many widely different embodiments of this invention may be made without departing from the spirit and scope hereof, it is to be

We claim:

1. Electrical component means including an electrical component body means having first continuous terminal means with all portions of the terminal means immediately adjacent the electrical component means intimately joined to one side of the electrical component body means, at least a pair of lead means of the continuous first terminal means having at least a portion of each of the lead means projecting from the electrical component body means in substantially the same direction, and a second continuous terminal means with all portions of the terminal means immediately adjacent the electrical component means intimately joined to another side of the electrical component body, at least a pair lead means of the continuous second terminal means projecting from the electrical component body means in the same direction as the pair of lead means of the continuous first terminal, the first and second continuous terminal means cooperating to help reduce the impedance of the electrical component at elevated frequencies.

2. The electrical component means of claim 1, wherein the first and second continuous terminal means are substantially U-shaped, and wherein the lead means of the first and the second substantially U-shaped terminal means are in spaced substantially parallel relationship.

3. The electrical component means of claim 2, wherein the lead means of each of the continuous substantially U-shaped terminal means are elongated wires.

4. The electrical component means of claim 3, including apertured insulating base means, the elongated wires of each of the continuous substantially U-shaped terminal means projecting thru apertures of the base means.

5. The electrical component of claim 4, including housing means cooperatively associated with the base means to substantially surround the electrical component body means.

6. The electrical component of claim 5, wherein the base means includes stand-off means adapted to space the electrical component body means from support means.

7. The electrical component means of claim 4, wherein the elongated lead wire means of the first continuous substantially U-shaped means are adapted to engage with eath other, and wherein the elongated wire lead means of the second continuous substantially U-shaped means are adapted to engage with each other.

8. The electrical component means of claim 7, wherein the elongated wire lead means of the first continuous substantially U-shaped means are adapted to lock with each other, and wherein the elongated lead wire lead means of the second continuous substantially U-shaped means are adapted to lock with each other.

9. The electrical component means of claim 1, wherein the electrical component body means includes anode means, cathode means, and electrolyte means between and contacting the anode means and the cathode means, and wherein the entire length of the first continuous terminal means immediately adjacent the anode means intimately contacts the anode means and the entire length of the second continuous terminal means immediately adjacent the cathode means intimately contacts the cathode means.

10. The electrical component means of claim 9 including means housing the electrical component body means and wherein the lead means of the first and second terminal means are elongated wires projecting from the means housing the electrical component body means.

11. In combination, the electrical component means of claim 1 and an apertured electrically insulating means for supporting the electrical component means, the pair of lead means of the first terminal means including a portion projecting thru apertures of the support means, the pair of lead means of the second terminal means including a portion projecting thru apertures of the support means.

12. The combination of claim 11, wherein the lead means of the first terminal means are spaced apart elongated wires projecting thru apertures in the support means and engaging with a side of the support means opposite a side of the support means adjacent the electrical component means, and wherein the lead means of the second terminal means are spaced apart elongated wires projecting thru apertures in the support means and engaging with a side of the support means opposite the side of the support means adjacent the electrical component means.

13. The combination of claim 12, wherein the elongated wires are clenched to the opposite side of the support means in a manner as to be spaced from each other.

14. The combination of claim 12, wherein the elongated lead wires are twisted together to lock the electrical component means to the support means.

15. The combination of claim 11, wherein the electrical component body means includes anode means, cathode means, and electrolyte means between and contacting the anode means and the cathode means, and wherein all portions of the first continuous terminal means immediately adjacent the anode means intimately contact the anode means and all portions of the second continuous terminal means contact immediately adjacent the cathode means intimately contact the cathode means.

16. The combination of claim 15, wherein the component body is a capacitor body.

17. The combination of claim 16, wherein the electrolyte means of the capacitor body is a solid electrolyte means.

18. A method of making the electrical component means of claim 1 including the steps of providing an electrical component body means, joining all portions of the contiuous first terminal means immediately adjacent one side of the electrical component body means to the one side of the electrical component body means and at least a portion of each of the lead means projecting from the electrical component body means is substantially the same direction, and joining all portions of the continuous second terminal means immediately adjacent another side of the electrical component body means to the other side of the electrical component body means and the lead means projecting from the electrical component body means in the same direction as the lead means of the continuous first terminal means, the first and the second terminal means cooperating to help reduce the impedance of the electrical component means at elevated operating frequencies.

19. The method of claim 18, wherein the electrical component means is a capacitor.

20. The method of claim 18 including the further step of inserting the lead means of the first and second terminal means thru apertures in a support means, and engaging the lead means with a side of support means opposite the side of the support means adjacent the electrical component means.

21. The method of claim 20 including the further steps of engaging the lead means of the first terminal means, and engaging the lead means of the second terminal means after insertion into the apertures of the support means.

22. A method of making the combination of claim 11, including the steps of providing an apertured electrically insulating base means and an aperture electrically insulating support means, providing an electrical component body means having a first continuous substantially U-shaped terminal means with a curved portion and all other portions of the terminal means immediately adjacent the electrical component body means intimately joined to one side of the electrical component body means and lead means projecting from the electrical component body means and a second continuous substantially U-shaped terminal means with a curved portion and all other portions of the terminal means immediately adjacent the electrical component body means intimately joined to another side of the electrical component body means and lead means projecting from the electrical component body means, inserting the lead means of the first and second terminal means into and thru apertures of the apertured base means, forming a housing over the electrical component body means to provide the electrical component means, inserting the lead means of the first and second terminal means into and thru the apertures of the support means, engaging the lead means of the first substantially U-shaped means with the support means to help cooperatively associate the electrical component means with the support means, and engaging the lead means of the second substantially U-shaped means with the support means to help cooperatively associate the electrical component means with the support means.

23. Th method claim 22, wherein the step of engaging the lead means of the first substantially U-shaped terminal means includes twisting together the lead means of the first terminal means after insertion into the apertures of the support means, and wherein the step of engaging the lead means of the second substantially U-shaped terminal means includes twisting together the lead means of the second terminal means after insertion into the apertures of the support means to lock the electrical component means to the support means.

* * * * *

UNITED STATES PATENT OFFICE
CERTIFICATE OF CORRECTION

Patent No. 3,806,770    Dated 04/23/74

Inventor(s) Gerald A. Voyles & Paul S. Deak

It is certified that error appears in the above-identified patent and that said Letters Patent are hereby corrected as shown below:

Col. 1, line 49, cancel "substantailly" and insert ---substantially---
Col. 1, line 66, after "means" insert ---is---
Col. 2, line 16, cancel "leads" and insert ---lends---
Col. 3, lines 29 & 30, Cancel "resiliently" and insert ---resilient---
Col. 4, line 15, after "member" insert ---14---
Col. 4, line 45, cancel "12" and insert ---11---
Col. 5, line 38, delete flows insert ---flowed---
Col. 5, line 62, delete "10" insert ---19---
Col. 6, line 2, after four insert ---(4)---
Col. 6, line 2 delete termiinal insert ---terminal---
Col. 6, line 3, insert "a" after ---for---
Col 6, line 3, insert "(2) after two
Col. 6, line 36, insert ---(4)--- after four
Col. 6, line 41 delete to insert ---not---
Col. 7, line 52 delete eath insert ---each---
Col. 8, line 60 delete is insert ---in---
Col. 10, line 17, delete Th insert ---The---at the beginning of paragraph Signed and sealed this 5th day of November 1974.

(SEAL)
Attest:

McCOY M. GIBSON JR.
Attesting Officer

C. MARSHALL DANN
Commissioner of Patents